US008702246B2

(12) United States Patent
Kurosawa

(10) Patent No.: US 8,702,246 B2
(45) Date of Patent: Apr. 22, 2014

(54) CONTROL APPARATUS AND METHOD FOR CONTROLLING PROJECTOR APPARATUS

(75) Inventor: Takahiro Kurosawa, Kunitachi (JP)

(73) Assignee: Canon Kabushiki Kaisha, Tokyo (JP)

(*) Notice: Subject to any disclaimer, the term of this patent is extended or adjusted under 35 U.S.C. 154(b) by 697 days.

(21) Appl. No.: 12/627,999

(22) Filed: Nov. 30, 2009

(65) Prior Publication Data

US 2010/0171930 A1    Jul. 8, 2010

(30) Foreign Application Priority Data

Jan. 7, 2009   (JP) ................................ 2009-001829

(51) Int. Cl.
  *G03B 21/26*   (2006.01)
  *G09G 5/00*   (2006.01)

(52) U.S. Cl.
  USPC .............................. 353/94; 353/30; 345/1.3

(58) Field of Classification Search
  USPC .......... 353/94, 30, 48, 49, 69, 70; 352/69, 70, 352/71; 348/745, 746, 806, 840
  See application file for complete search history.

(56) References Cited

U.S. PATENT DOCUMENTS

| | | | |
|---|---|---|---|
| 6,513,938 B2 | 2/2003 | Kubota et al. | 353/94 |
| 6,540,363 B1 * | 4/2003 | Steffensmeier | 353/31 |
| 6,811,264 B2 * | 11/2004 | Raskar et al. | 353/94 |
| 2005/0110959 A1 * | 5/2005 | Miyazawa et al. | 353/94 |
| 2009/0002637 A1 | 1/2009 | Harada | |

FOREIGN PATENT DOCUMENTS

| | | | |
|---|---|---|---|
| CN | 101035232 | 9/2007 | ............ G03B 21/00 |
| JP | H07236128 A | 9/1995 | |
| JP | 10-164420 | 6/1998 | ............ H04N 5/232 |
| JP | 2001184044 A | 7/2001 | |
| JP | 2001-268476 | 9/2001 | ................ G02F 1/13 |
| JP | 2004-239968 | 8/2004 | ............ G03B 21/00 |
| JP | 2004-356919 | 12/2004 | ............ G03B 21/00 |
| JP | 2006-003903 | 1/2006 | ................ G09G 5/00 |
| JP | 2006-246038 | 9/2006 | ............... H04N 7/15 |
| JP | 2008187362 A | 8/2008 | |
| JP | 2008249907 A | 10/2008 | |
| JP | 2003-348500 A | 12/2013 | |
| WO | 2006/030501 A1 | 3/2006 | |

OTHER PUBLICATIONS

Office Action dated Jun. 29, 2011 in counterpart Chinese Application No. 201010001508.5, and English language translation, 8 sheets.
Japanese Office Action dated Jul. 19, 2013, issued in related Japanese Patent Application No. 2009-001829.
Japanese Office Action dated Oct. 25, 2013, issued in related Japanese Patent Application No. 2009-001829.

* cited by examiner

*Primary Examiner* — William C Dowling
*Assistant Examiner* — Ryan Howard
(74) *Attorney, Agent, or Firm* — Fitzpatrick, Cella, Harper & Scinto

(57) ABSTRACT

A control apparatus for controlling a projector apparatus projecting an image in provided. The apparatus includes an input unit for inputting layout information relating to a layout of the images projected by a plurality of projector apparatuses, an obtaining unit for obtaining respective projection areas of the plurality of projector apparatuses, a determination unit for determining a correction amount of the respective projection areas of the plurality of projector apparatuses based on the layout information input by the input unit and the projection areas obtained by the obtaining unit, and a notifying unit for notifying the plurality of projector apparatuses of the correction amount determined by the determination unit.

18 Claims, 8 Drawing Sheets

CONTROL APPARATUS AND METHOD FOR CONTROLLING PROJECTOR APPARATUS

BACKGROUND OF THE INVENTION

1. Field of the Invention

The present invention relates to a control apparatus and method for controlling a projector apparatus.

2. Description of the Related Art

Recently, the tendency of networks such as the Internet to feature high bandwidth is increasing and video conference systems have become widely used that are capable of communicating not only audio signals but video signals as well. In video conferencing systems, there are cases wherein it is desirable for a plurality of images to be projected on the same screen at one location. For example, there are cases when it is desirable to simultaneously project the meeting room of the other party while material commonly used in video conference systems is being projected. Further, in addition to that, there are cases wherein it is also desirable to simultaneously project an image of the local meeting room. Thus, as a simple method to project a plurality of images on the same screen, there is a method to project using a separate projector apparatus for each image. In this case, it is considered necessary to bring portable projector apparatuses in to the meeting room when the number of locations connected to the video conferencing system is increased.

Users of the video conferencing system are required to adjust the projection positions or projection sizes of the image that the respective projector apparatuses project before the videoconference can start. For example, a user may make adjustments so that the projection positions do not overlap, or may adjust the projection size such that the size of the human image projected on the screen is comparable to that of a person actually in the local meeting room.

In connection with such video conferencing system, the following technology is proposed.

Projector Communication Technology

A projector apparatus having a communicating function is released. In Japanese Patent Laid-Open No. 2006-3903, technology is disclosed which synchronizes the contents displayed by centrally controlling a plurality of projector apparatuses which are capable of communicating via a personal computer. In Japanese Patent Laid-Open No. 2004-239968, technology is disclosed to manage the role of a plurality of projector apparatuses having a communication function. The described invention assumes a client-server relationship between the projector apparatuses in particular, whereby a client projector apparatus is capable of receiving an image from a server projector apparatus. In Japanese Patent Laid-Open No. 2006-246038, a method is described whereby the image for the video conferencing system is transferred to a projector apparatus having a communicating function. In particular, a display device can be selected dynamically, despite prior settings.

Projector Image Linking Technology

A video-wall display technology is provided whereby one image is projected on a screen from a plurality of images by linking the projected image of a plurality of projector apparatuses. Japanese Patent Laid-Open Nos. 2001-268476 and 2004-356919 describe judging the overlap or correction of projected images.

Network Camera Technology

In Japanese Patent Laid-Open No. 10-164420, a network camera is provided comprising an image capturing unit and a network unit, which distributes a captured image to the other party of the communication and receives a control signal for the camera from the other party of the communication.

Human Image Detecting Technology

For example, in "Face Detection for Multi-modal Speech Recognition" Kazumasa Murai, Satoshi Nakamura; (Information Processing Society of Japan, Journal of Spoken Language Information Processing Vol. 2002, No. 10, pp. 39-44; Feb. 1, 2002), technology is provided to detect a human area in an image. Further, face (or individual) recognition technology is also used to check the extracted feature amount of the face of the human image with an existing feature amount database for each individual.

Home Network Connection Technology

DLNA (Digital Living Network Alliance) assumes the presence of audio/video distribution in a home network and provides a specification relating to the interoperability of network apparatuses (DLNA-version 1.5 "DLNA Network Device Interoperability Guidelines expanded: March 2006" (Digital Living Network Alliance; March 2006)). DLNA v1.5 strictly specifies that the audio/video codec and transfer protocol are to be based on the UPnP specification (including UPnP AV specification) in order to realize an improvement of the interoperability of the network apparatuses. Detection of the network apparatuses is based on SSDP (Simple Service Discovery Protocol).

However, even if one of these technologies is used, it takes time to adjust the multi-screen display and to correct the image (i.e., to perform calibration of the size or position) when a plurality of projector apparatuses is used. In particular, because of an increased need to adjust or correct the image, the above problem becomes worse in situations where a portable projector apparatus is used.

The present invention provides a projector system that includes a plurality of projector apparatuses for projecting images on the same screen, whereby the adjustment of projection parameters for each projector apparatus can be achieved efficiently.

SUMMARY OF THE INVENTION

According to one aspect of the present invention, a control apparatus for controlling a projector apparatus projecting an image, comprises an input unit for inputting layout information relating to a layout of the images projected by a plurality of projector apparatuses; an obtaining unit for obtaining respective projection areas of the plurality of projector apparatuses; a determination unit for determining a correction amount of the respective projection areas of the plurality of projector apparatuses based on the layout information input by the input unit and the projection areas obtained by the obtaining unit; and a notifying unit for notifying the plurality of projector apparatuses of the correction amount determined by the determination unit.

Further features of the present invention will become apparent from the following description of exemplary embodiments with reference to the attached drawings.

DESCRIPTION OF THE EMBODIMENTS

The embodiment of the present invention will be described with reference to the attached drawings.

First Embodiment

In the first embodiment, the projector system according to the present invention will be described.

Environment of the Projector System 100

Figure 1:
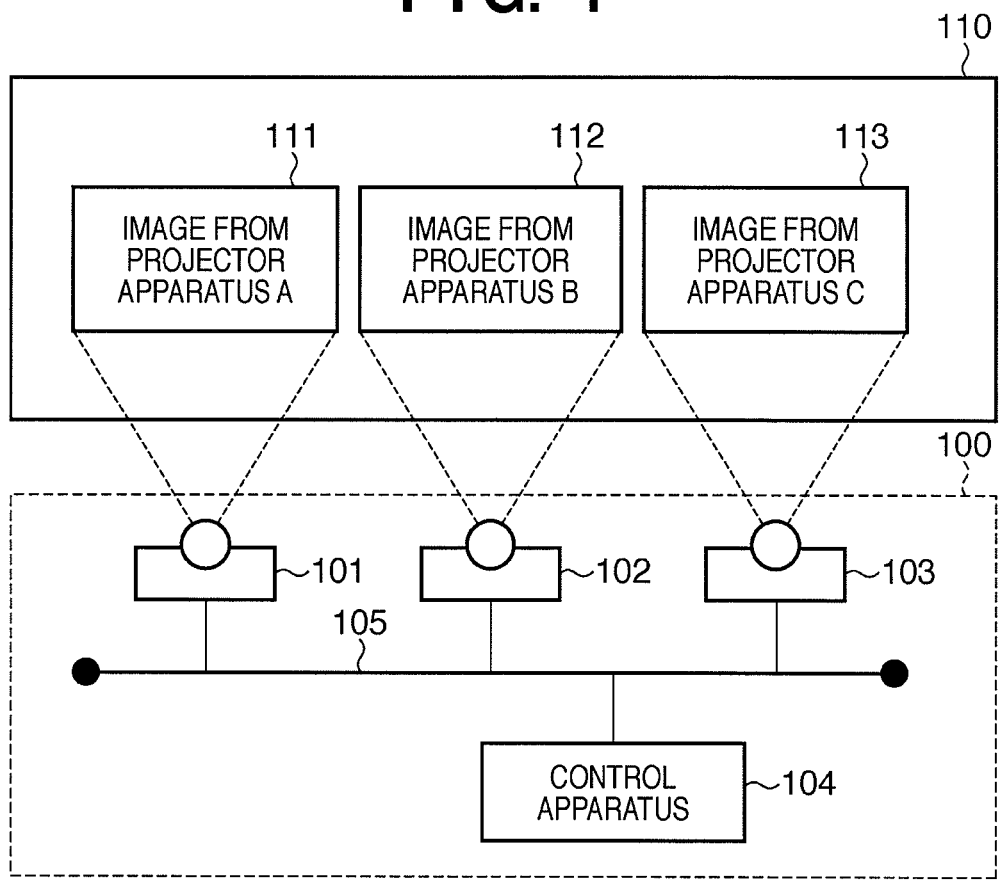
FIG. 1 illustrates an exemplary configuration of a projector system according to the first embodiment of the present invention.

FIG. 1 illustrates an exemplary configuration using the projector system 100 according to the embodiment. The projector system 100 comprises a projector apparatus A 101, a projector apparatus B 102, a projector apparatus C 103 and a control apparatus 104. In the present embodiment, an example wherein three projector apparatuses are included in the projector system will be described but the present invention can be applied whenever two or more projector apparatuses are included. Further, respective projector apparatuses need not always have completely the same functions and capabilities and their functions and capabilities may differ from each other provided that each has the functions described hereinafter.

For example, the resolution or the luminance of respective projector apparatuses 101-103 may differ from each other. The respective projector apparatuses 101-103 and the control apparatus 104 are connected through the network 105. As the network 105, for example, Ethernet® or wireless LAN is used but any form of network which can communicate data bi-directionally may be used. For example, the network 105 may be IEEE 802.11 or a wireless connection such as Bluetooth or a network superimposed on electric power transmission lines or a wired connection such as IEEE 802.3 (Ethernet®) may be used. Further, the network 105 may be a device-connecting type such as W-HDMI, IEEE 1394 or USB.

The respective projector apparatuses 101-103 project the image on the same screen 110. A single sheet of material may be used to form the screen 110 or a plurality of sheets may be combined to form substantially the same screen. The images projected by the respective projector apparatuses 101-103 are respectively projected on projection areas 111-113 of the screen 110.

Figure 2:
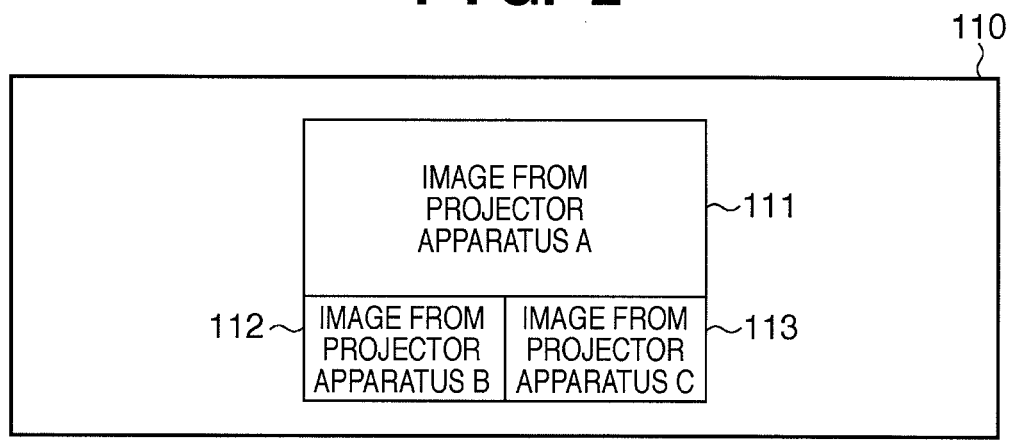
FIG. 2 illustrates an exemplary projection layout in the first embodiment.

The projection layout can be such that respective projection areas are lined up sideways and the size of the respective areas are of a comparable level, as shown in FIG. 1, but another layout may be used. For example, as shown in FIG. 2, the projection layout can be selected such that the projection area 111 is allocated in the upper portion with a relatively large area and the projection areas 112 and 113 are allocated in the lower portion with a relatively small area. FIG. 2 illustrates an exemplary projection layout according to the present embodiment. Adjusting respective projector apparatuses to realize such a projection layout places a burden on the user, so the projector system 100 according to the present embodiment automatically adjusts the projection area of respective projector apparatuses as designated by the user.

Functional Block of the Projector System 100

Figure 3:
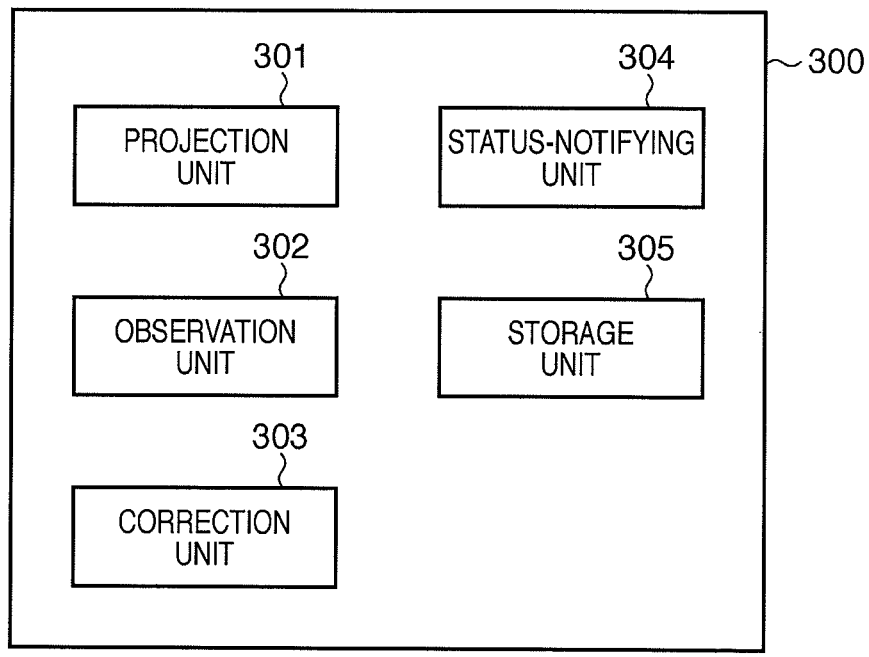
FIG. 3 illustrates an exemplary function block of the projector apparatus according to the first embodiment.

The function of the projector apparatus 300 and the control apparatus 104 will now be described with reference to FIGS. 3 and 4. FIG. 3 illustrates an exemplary functional block diagram of the projector apparatus 300 according to the present embodiment. The projector apparatus 300 functions as the projector apparatus A 101, the projector apparatus B 102 and the projector apparatus C 103 as shown in FIG. 1. The projector apparatus 300 comprises a projection unit 301, an observation unit 302, a correction unit 303, a status-notifying unit 304 and a storage unit 305. The projection unit 301 projects the received video data on the screen 110. The projection unit 301 may reproduce audio data together with video data. The projection unit 301 generates a video data receiving port or prepares a decode renderer when the video data is projected, however, a detailed explanation of them will be omitted because techniques for realizing them are well known.

The observation unit 302 observes the images projected on the screen 110. The image observed by the observation unit 302 is not limited to the image projected by the projector apparatus 300 itself and includes all images that belong to the observable area including the images projected by other projector apparatuses 300.

The correction unit 303 corrects the projection parameters. By correcting the projection parameters using the correction unit 303, the projection area on the screen 110 projected by the projection unit 301 and the luminance can be varied. The projection parameters include: the projection position, the projection size, perspectives, the tilt axis correction, the trapezoidal correction, the focus distance, the chrominance (color temperature), the luminance, the white balance and the like. In performing control to correct the projection parameters, control of a backlight or display panel is included as well as control of the optical system (zoom or lens shift) which includes a lens driver of the projector apparatus. By control performed by the projection unit 301 as well as feedback control performed by using the observation unit 302 of the projector apparatus 300, the required control can be executed quickly and correctly. The status-notifying unit 304 transmits the projection parameters of its projector apparatus 300 to the control apparatus 104. The storage unit 305 stores various information such as projection parameters.

Figure 4:
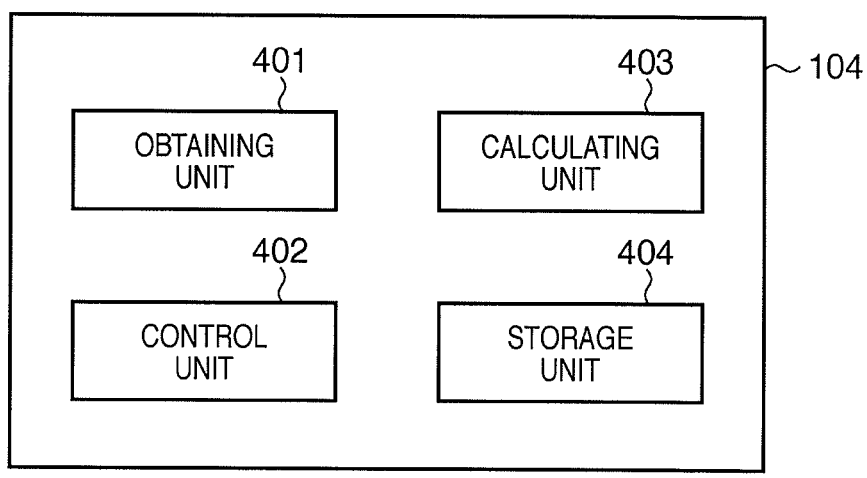
FIG. 4 illustrates an exemplary function block of a control apparatus according to the first embodiment.

FIG. 4 illustrates an exemplary function block of the control apparatus 104 according to the present embodiment. The control apparatus 104 comprises an obtaining unit 401, a control unit 402, a calculating unit 403 and a storage unit 404. The obtaining unit 401 obtains the projection layout. The projection layout may be obtained by input from the user of the projector system 100 or may be obtained as a processing result of another computer program. The method of obtaining the projection layout is not limited especially.

The control unit 402 controls the projector apparatus 300 included in the projector system 100. The control unit 402, for example, controls the respective projector apparatus 300 to adjust the projection layout as described later. Any form of identifier of the projector can be used provided that it can uniquely identify each projector apparatus. For example, a network address, a serial number or model information of the projector apparatus 300 can be utilized as an identifier for a projector apparatus 300. The capabilities of a projector apparatus 300 include use of an available communication protocol, parameters (resolution, codec, quality, bit rate, sampling rate/frame rate) of the video or audio data, and time-out duration.

The calculating unit 403 calculates the projection area after correction based on the observation result and projection parameters received from the projector apparatuses 300. The storage unit 404 stores the identifier for identifying the projector apparatus as well as the capabilities of the projector apparatus 300.

Hardware Structure of the Projector System 100

Figure 5:
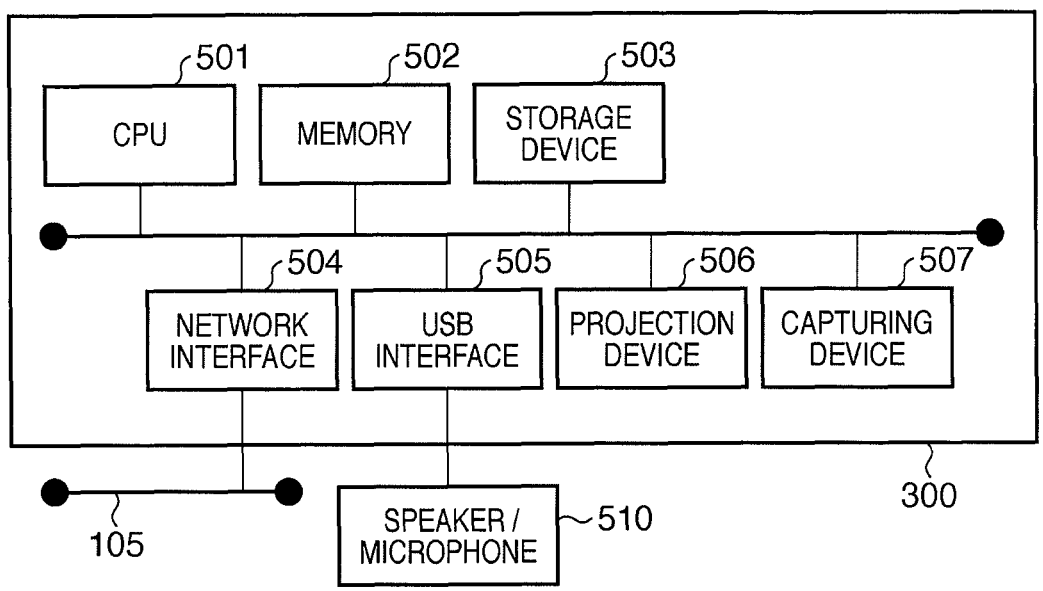
FIG. 5 illustrates an exemplary hardware structure of the projector apparatus according to the first embodiment.

The hardware structure of the projector apparatus 300 and the control apparatus 104 will now be described with reference to FIGS. 5-7. FIG. 5 illustrates an exemplary hardware structure of the projector apparatus 300. The projector apparatus 300 comprises a CPU 501, a memory 502, a storage device 503, a network interface 504, a USB interface 505, a projection device 506 and a capturing device 507.

The CPU 501 carries out overall control of the projector apparatus 300. The memory 502 stores the computer program or processing data and functions as a part of the storage unit 305. The storage device 503 aids the memory 502, stores the video data or various information and functions as a part of the storage unit 305. The network interface 504 provides a connection to the network 105 and functions as a status-notifying unit 304. The projector apparatus 300 communicates with the control apparatus 104 via the network interface 504. The USB interface 505 provides for delivery/receipt of audio data by connecting to a speaker/microphone 510 or for a connection to an external apparatus. The projection device 506 comprises a lens, a lens driver, an auxiliary panel, a display panel or a lighting system and functions as the projection unit 301. The capturing device 507 comprises a lens or an optical sensor for a lens driver and functions as the observation unit 302.

The memory 502 and the storage device 503 may be a high speed RAM, a nonvolatile memory such as an HDD or a flash memory, a removable storage device or a combination thereof. The network interface 504 may be a wireless interface (WLAN: IEEE 802.11), a wired interface (LAN: IEEE 802.3) or a combination thereof. These are the same as in the hardware structure of the control apparatus 104.

Figure 6:
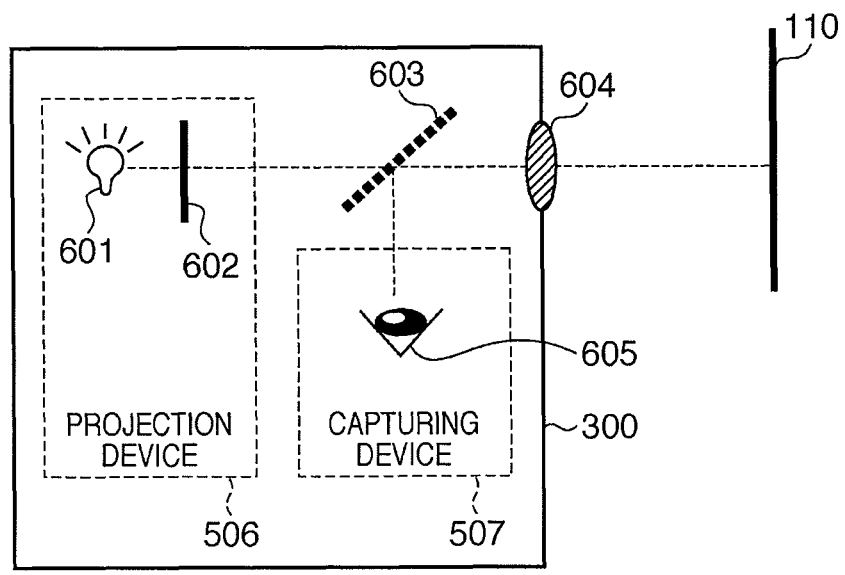
FIG. 6 illustrates exemplary structure of projection device 506, capturing device 507 and an optical system 604 of the projector apparatus 300 according to the first embodiment.

FIG. 6 illustrates an exemplary configuration of the projection device 506, the capturing device 507 and the optical system 604 of the projector apparatus 300 according to the present embodiment. A backlight 601, a display panel 602, a half mirror 603 and an optical system 604 controlled by the projection device 506 are arranged in line. The imaging sensor 605 controlled by the capturing device 507 is located at a position in which it has an optical axis in common with the half mirror 603. By this arrangement, the capturing device 507 can observe the projection result that the projection device 506 projects on the screen 110 and its periphery. Further, the optical system 604 may include a plurality of lens drivers (not shown) for focusing or trapezoidal correction and control as required.

Figure 7:
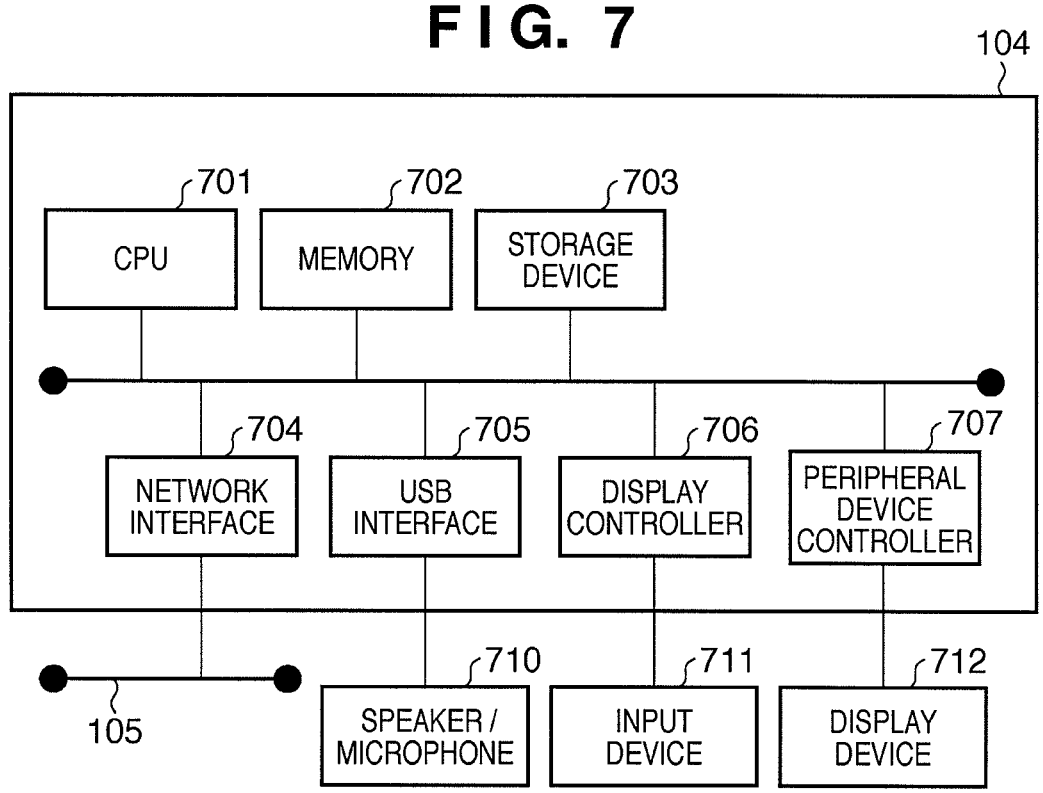
FIG. 7 illustrates exemplary hardware structure of the control apparatus 104 according to the first embodiment.

FIG. 7 illustrates an exemplary hardware structure of the control apparatus 104 according to the present embodiment.

The control apparatus 104 comprises a CPU 701, a memory 702, a storage device 703, a network interface 704, a USB interface 705, a display controller 706 and a peripheral device controller 707.

The CPU 701 carries out overall control of the control apparatus 104 and functions as the control unit 402 and the calculating unit 403. The memory 702 stores a computer program and the data used for processing and functions as a part of the storage unit 404. The storage device 703 aids the memory 702, stores the video data or various information and functions as a part of the storage unit 404. The network interface 704 provides the connection to the network 105. The control apparatus 104 communicates with respective projector apparatuses 300 via the network interface 704. The USB interface 705 is connected to the speaker/microphone 710 and provides delivery/receipt of audio data and connection to external apparatuses. The display controller 706 controls the display device 712 for displaying the processing result or the input display to the user. The peripheral device controller 707 controls input devices 711 such as a mouse, a keyboard or a remote controller for receiving data from the user and functions as the obtaining unit 401. The input device 711 may be an LED controller or an input controller for an external sensor.

Operation of the Projector System 100

Figure 8:
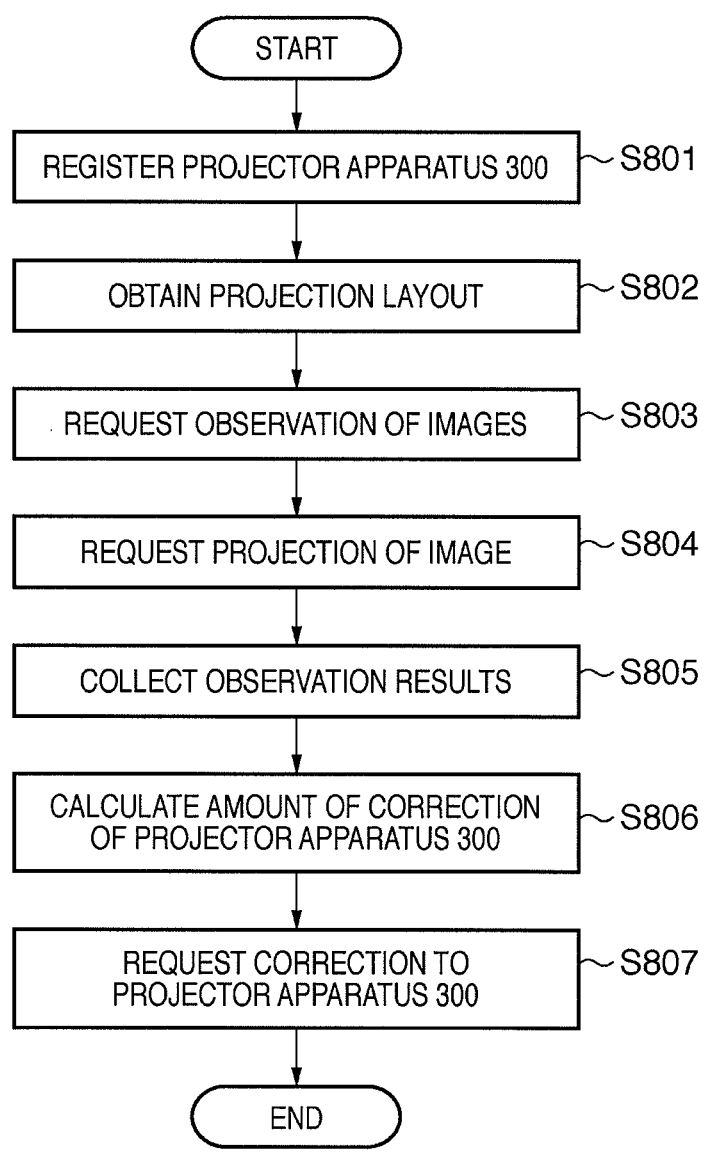
FIG. 8 illustrates a flow chart showing exemplary operation of the projector apparatus 300 and the control apparatus 104 according to the first embodiment.

The operation of the projector system 100 will now be described with reference to FIG. 8. FIG. 8 is a flow chart illustrating exemplary operation of the projector apparatus 300 and the control apparatus 104 according to the present embodiment. The respective apparatuses are caused to perform the processing operations described in the flow chart by the execution by the CPU of a computer program stored in the memory of the respective apparatuses.

In step S801, the control unit 402 of the control apparatus 104 registers the projector apparatuses 300 used in the projector system 100. The status-notifying unit 304 of the registered projector apparatus 300 notifies the capability of its projector apparatus 300 to the control apparatus 104.

The control unit 402 may register the projector apparatus 300 based on the designation of the user. The control unit 402 may automatically register the projector apparatus 300 located within the range of communication via the network 105. Further, the user may manually start the projector apparatus 300. The projector apparatus 300 may be started by a remote control command from the control unit 402 of the control apparatus 104. In response to the start of the projector apparatus 300, a various setting values are read out from the storage device 503 or via the network 105 and stored in the memory 502. The various setting values include the specified values on factory shipment or values designated by the user.

Figure 9:
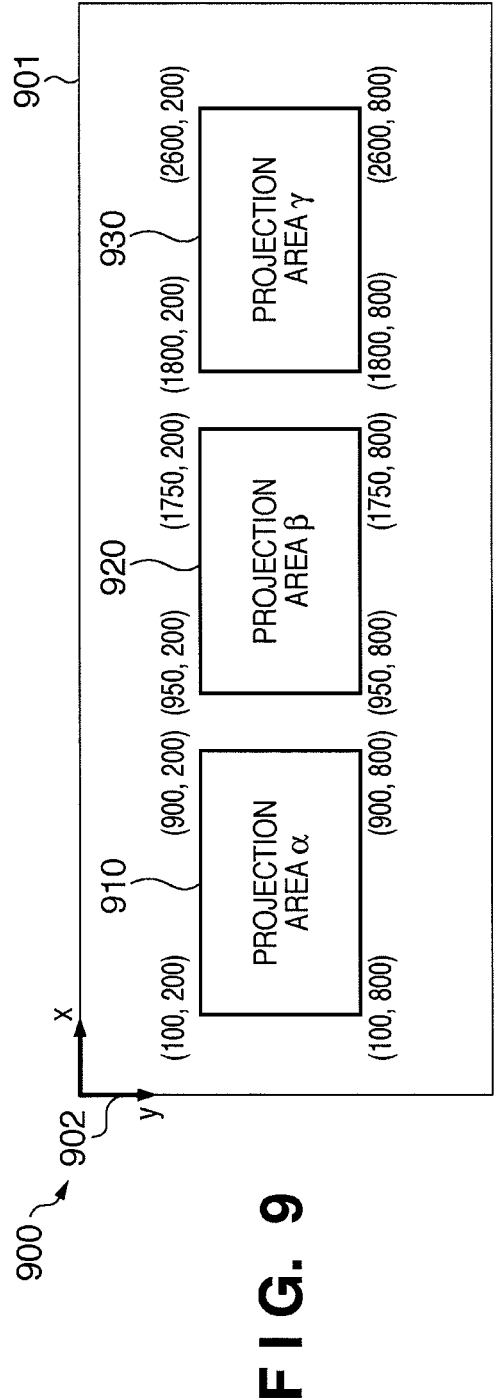
FIG. 9 illustrates an exemplary projection layout obtained by the control apparatus according to the first embodiment.

In step S802, the obtaining unit 401 of the control apparatus 104 obtains the projection layout 900 from the user. The projection layout 900 obtained by the control apparatus 104 will now be described with reference to FIG. 9. FIG. 9 illustrates an exemplary projection layout 900 obtained by the control apparatus 104. The user allocates the projection areas on the virtual screen 901 displayed by the obtaining unit 401. For example, the user allocates the projection areas α 910, β 920 and γ 930 laterally in line with the same size. The obtaining unit 401 stores, in the storage unit 404, the projection areas allocated using coordinate system values in the coordinate system 902 which supposes the upper-left-hand corner point of the virtual screen 901 as the origin, the right direction as the x-axis and the downward direction as the y-axis. As a result, the coordinate system values of the corners of the respective projection areas are set as shown in the drawing.

The obtaining unit 401 may further receive the order of priority of the projector apparatuses 300 used in the respective projection areas. For example, the user can designate that the projection area β 920, located in the middle, is projected by the projector apparatus 300 having the highest resolution.

Back to FIG. 8, in step S803, the control unit 402 of the control apparatus 104 requests that all projector apparatuses 300 begin observation of the image. The observation unit 302 of the each projector apparatus 300, upon receiving the request to start observation, starts observation and stores the observation results sequentially in its storage unit 305.

In step S804, the control unit 402 of the control apparatus 104 issues a command to project to the projector apparatus 300 and requests that the image be projected. In the present embodiment, the respective projector apparatuses 300 observe the images projected by the plurality of projector apparatuses on the same screen 110. Accordingly, it is necessary to identify the projector apparatus 300 by which the respective images are being projected.

As one method for identifying the image, a predetermined projection pattern may be projected to the projector apparatus 300 by the control unit 402 of the control apparatus 104. The predetermined projection pattern is an image displaying a predetermined color or a predetermined grating frequency and a given projector apparatus 300 can be identified when the observation unit 302 observes its projection pattern.

For example, the control unit 402 has the projector apparatus A 101 project a projection pattern image comprising a purely red color. Similarly, the control unit 402 has the projector apparatus B 102 project a purely blue image and has the projector apparatus C 103 project a purely yellow image. In this case, the observation unit 302 of the projector apparatus A 101 observes images displayed onto the screen 110 in the respective colors. The observation unit 302 transmits the projection area of the images of the respective colors together with the observed projection pattern to the control apparatus 104 as the observed result.

As another method of identifying the image, the observation unit 302 may store the timestamp when a given image is observed. The control unit 402 designates times when images are projected to respective projector apparatuses 300 and the projector apparatuses 300 project their images at their respectively designated times. The respective projector apparatuses 300 transmit the projection area of the observed images together with the timestamp showing the time when the image was observed as the observed result to the control apparatus 104. The control apparatus 104 can determine the correspondence between the projection area and the projector apparatus 300 by comparing the designated timestamp and the timestamp of the observed result.

As a further method of identifying the image, the observation unit 302 may store the image associated with the observed order. The control unit 402 of the control apparatus 104 may request the projection of the image such that the respective projector apparatuses 300 project the image at a different timing.

The projection unit 301 of the projector apparatus 300 receiving the request for projection projects the requested image on the screen 110. As described above, the projector apparatus 300 may project a predetermined projection pattern and may designate only the projection time without limiting the image to be projected. The projector apparatus 300 may project the image with the widest field angle. In this manner, it is possible for any of the respectively projected images to be within the observation range of the other projector apparatuses 300.

In step S805, in order to collect the observed results, the control unit 402 of the control apparatus 104 requests that all projector apparatuses 300 transmit their observed result. The observation unit 302 of the projector apparatus 300 receiving the request transmits the observed result to the control apparatus 104. The observed result may include the timestamp when the image was observed for each image, the observed area, the color or the pattern of the image or the observed order. Further, it may include color difference information or luminance information.

In step S806, the calculating unit 403 of the control apparatus 104 calculates the correction information, including the amount of correction, for the respective projector apparatuses 300, by determining the present projection layout on the screen 110 based on the collected observed results. The method for calculating the amount of correction will be described later.

In step S807, the calculating unit 403 of the control apparatus 104 issues a correction command and transmits correction information to the respective projector apparatuses 300, and the correction unit 303 of the projector apparatus 300 corrects according to the amount of correction. Concretely, the correction unit 303 corrects the scale of the projection by zoom control, a pan control in the horizontal direction and tilt control in the vertical direction using the optical system and the trapezoidal correction using the projection unit. Further the correction unit may correct the color and luminance of the projection parameters or other projection parameters.

Figure 10:
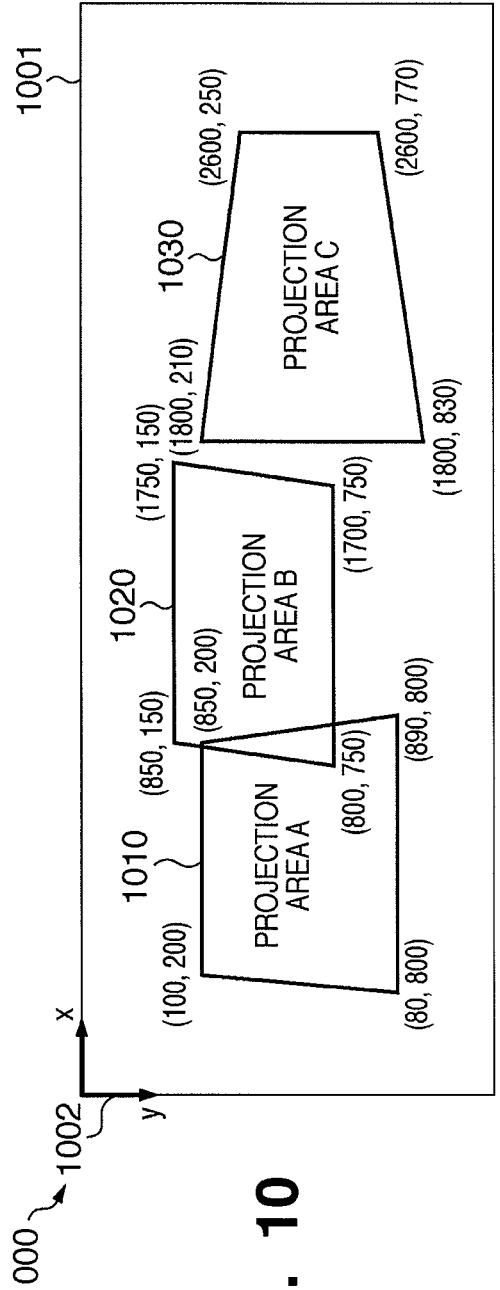
FIG. 10 illustrates an exemplary observed projection layout 1000 according to the first embodiment.

Next, details regarding calculation of the correction amount shown in step S806 in FIG. 8 will be described with reference to FIG. 10. FIG. 10 illustrates an example of the observed projection layout 1000. The control unit 402 of the control apparatus 104 collecting the observed results allocates the projection areas of the respective projector apparatuses 300 on the virtual screen 1001 based on the observed results of the projector apparatuses 300. On this virtual screen 1001 also, the coordinate system 1002 assumes that the left top point is the origin, the right direction is the x-axis and the downward direction as y-axis is set.

In FIG. 10, the projection area A 1010 is the projection area from the projector apparatus A 101. Similarly, the projection area B 1020 is the projection area from the projector apparatus B 102 and the projection area C 1030 is the projection area from the projector apparatus C 103. Depending on the observation range of the projector apparatus 300, there may be cases when each projector apparatus 300 can observe a part of projection areas 1010-1030. In this case, the control unit 402 synthesizes the observed results of the projector apparatuses 300 and generates the projection layout 1000.

The control unit 402 determines the projector apparatus 300 on which the respective projection area is to be displayed by comparing the observed projection layout 1000 and the projection layout 900 obtained in step S802 and further calculates the amount of correction for respective projector apparatuses 300. For example, the control unit 402 selects the projector apparatus A 101 as the projector apparatus 300 to project the projection area α 910. Alternatively, when the designation relating to the projector apparatus 300 to be used by the user is obtained in step S802, it may be prioritized. For example, it is assumed that the projector apparatus C 103 has the highest resolution; when the user designates that the projection area β 920 be projected using this projector apparatus C 103, the observed projection area C 1030 is corrected to be the position of the projection area β 920.

When the correspondence between obtained projection layout 900 and the projector apparatuses 300 is determined, the calculating unit 403 calculates the correction amount for each projector apparatus 300. For example, the calculating unit 403 calculates the correction amount for each projector apparatus 300 to be equal to the coordinate value determined by the obtained projection layout 900. The calculating unit 403 may calculate the correction amount after scaling or a translation of the obtained coordinate system value of the projection layout 900. Based on the correction amount, the correction unit 303 of the respective projector apparatuses 300 executes the correction, such as the trapezoidal correction.

Summary

As described above, in the projector system 100 according to the present embodiment, the projection layout can be adjusted by observing the projected images from the respective projector apparatuses.

Modifications

The main modifications of the present invention will now be described hereinafter. The projection layout may be adjusted based on a template of the projection layout defined in the projector system 100 beforehand instead of obtaining the projection layout from the user. For example, in the projector system 100, the projection layout shown in FIG. 9 is predefined as the template. The projector system 100 adjusts the projection layout such that it conforms to the template. Further, the projector system 100 may store a plurality of templates and the projection layout may be adjusted to conform to the template for which the adjustment is easiest.

Furthermore, in the present embodiment, the control apparatus 104 individually requests that the projector apparatuses project their images, however, the projector apparatus 300 may circulate a token and may project images sequentially. The token includes information such as the projection pattern to be projected by the respective projector apparatuses 300, the projection timing and the network information of the projector apparatuses 300 for circulating the token. The order by which the token is circulated may be, for example, ascending sequence of the network address.

Further, in the present embodiment, the control apparatus 104 is described to be a single apparatus, however, the projector apparatus 300 may function as the control apparatus 104 or a plurality of projector apparatuses 300 may share the function of the control apparatus 104.

Communication between the projector apparatuses 300 and communication between the projector apparatus 300 and the control apparatus 104 may be broadcast communication or multicast communication, and a notifying method may be used by which notification of events is given only to a specified communicating party that subscribes to them, like the event notifying mechanism of UPnP (Universal Plug and Play).

The projector system 100 obtains the projection layout, however, the projection layout may be adjusted according to a preset projection layout. For example, the control apparatus 104 may adjust the projection layout such that the projection layout pattern can be realized with a smaller correction amount by respectively comparing the observed projection layout 1000 and the pattern of the projection layout.

Second Embodiment

Figure 11:
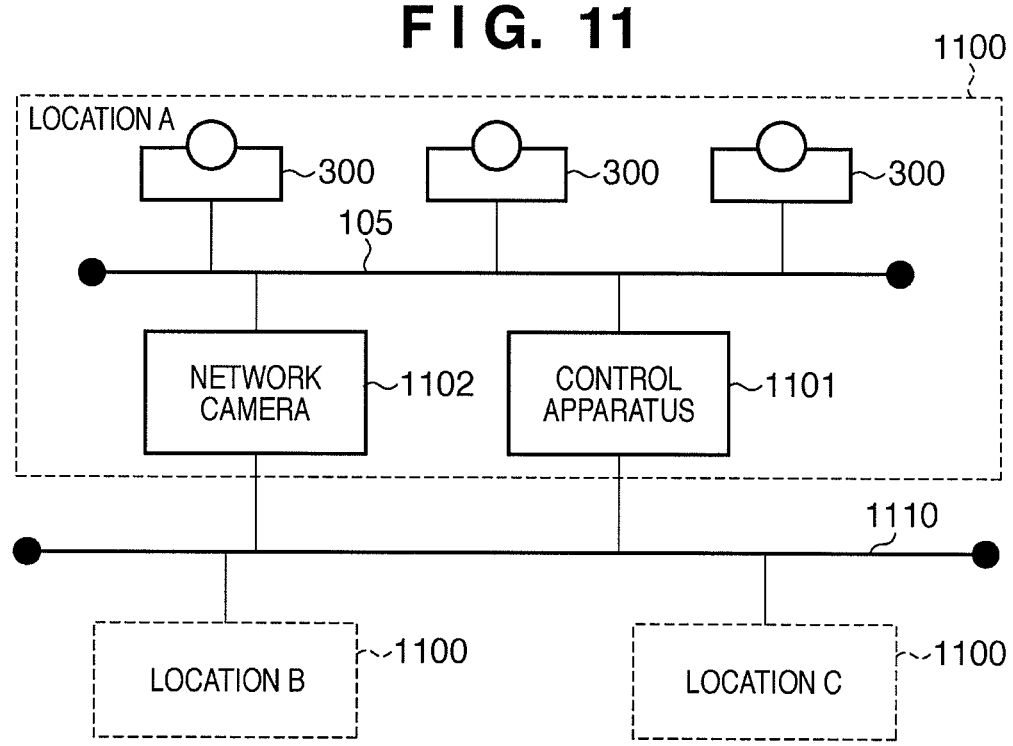
FIG. 11 illustrates an exemplary video conferencing system 1100 according to a second embodiment.

In the second embodiment, a video conferencing system using the projector system 100 described in the first embodiment will be described. The video conferencing system 1100 will now be described with reference to FIG. 11. FIG. 11 illustrates an example of the video conferencing system 1100 according to the present embodiment. The video conferencing system 1100 comprises a plurality of projector apparatuses 300, a control apparatus 1101 and a network camera 1102. In FIG. 11, a videoconference is executed between three locations; however, the number of locations is not limited to three.

The projector apparatus 300 is similar to that described in the first embodiment, and a description will therefore be omitted. The control apparatus 1101 controls the video conferencing system 1100. Further, the control apparatus 1101 includes the function of the control apparatus 104 described in the first embodiment. That is, the control apparatus 1101 can adjust the projection layout of the projector apparatus 300. The network camera 1102 captures an image of the video conferencing room and outputs it to the control apparatus 1101. The captured image is delivered to the other location via the control apparatus 1101. At the same time, the projector apparatus 300 of a given location may project its captured image. The network camera may be of any form, provided it is well adapted to a general video conferencing system. Accordingly, the detailed description of the network camera will be omitted.

The control apparatus 1101 is also connected to the network 1110. The video conferencing system 1100 in each location communicates via the network 1110. For example, the video conferencing system 1100 in each location communicates the image of the video conferencing room or a commonly viewed file and displays it using the projector apparatus 300. The control apparatus 1101 allocates the obtained image to the proper projector apparatus 300 and the image is displayed. For example, the image of a shared file is projected in the projection area 111 shown in FIG. 2, the image of location B is projected in the projection area 112 and the image of location C is projected in the projection area 113.

The network 1110 may be of any form. For example, the network 1110 may be an intranet managed by a company or organization, a wide-area network or the Internet, which provides worldwide data transport. Moreover, the network 1110 may be a home network connecting apparatuses in a home or a network connecting apparatuses outside of a given location.

Functional Block of the Control Apparatus 1101

Figure 12:
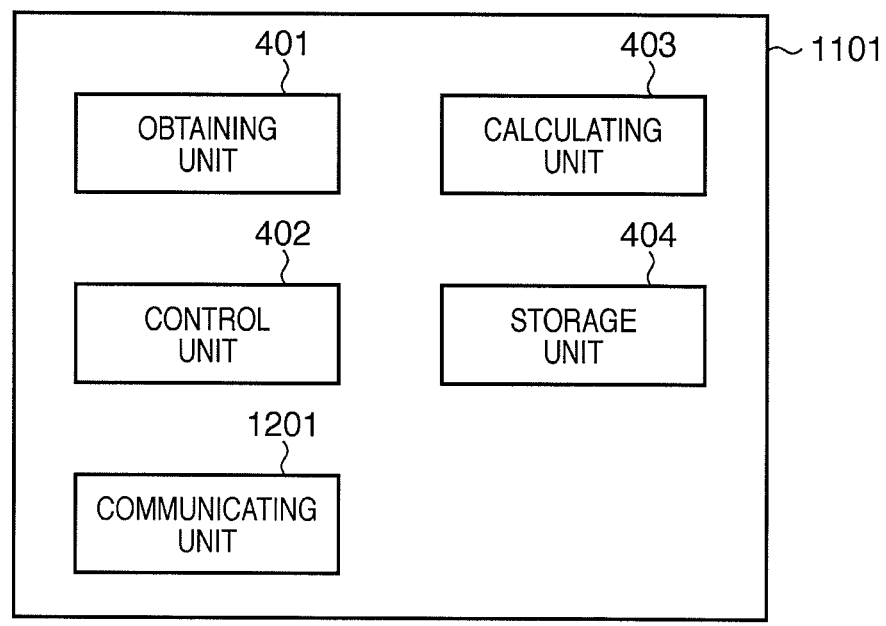
FIG. 12 illustrates an exemplary control apparatus 1101 according to the second embodiment.

The control apparatus 1101 according to the present embodiment will now be described with reference to FIG. 12. FIG. 12 illustrates an exemplary control apparatus 1101 according to the present embodiment. The same functions as the control apparatus 104 according to the first embodiment are denoted by the same reference numerals and only those points that differ will be described. A communicating unit 1201 sets the videoconference or transmits or receives the data with the video conferencing system 1100 located in another location. These operations can be realized by using the functions of a known video conferencing system and a detailed description will be omitted. For example, the communicating unit 1201 transmits the audio and video data obtained by the network camera 1102 or the video data input by the user of the video conferencing system 1100 to the video conferencing system 1100 located in the other location.

Operations of the Video Conferencing System 1100

Figure 13:
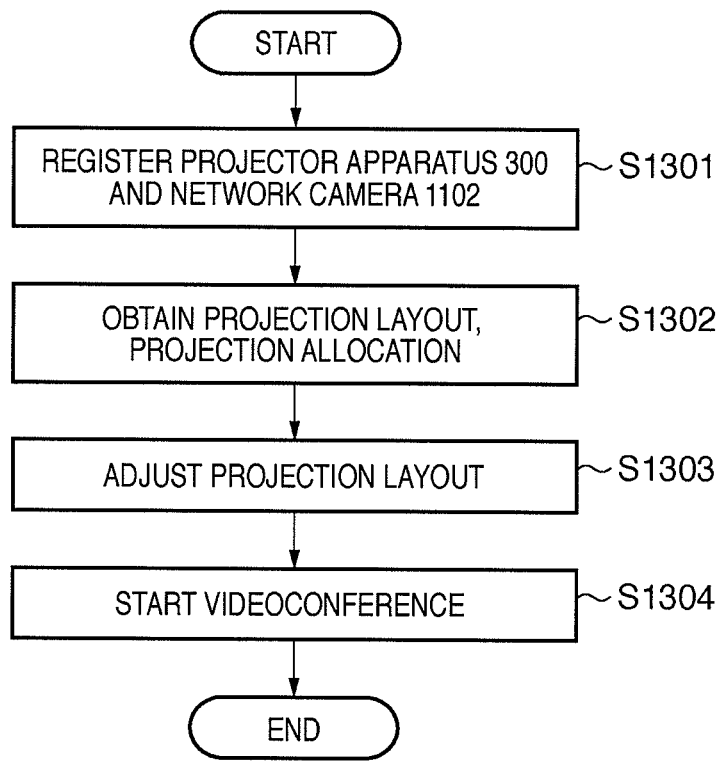
FIG. 13 illustrates a flow chart showing exemplary operation of the video conferencing system 1100 according to the second embodiment.

The operations of the video conferencing system 1100 will now be described with reference to FIG. 13. FIG. 13 illustrates a flow chart showing the operation of the video conferencing system 1100 according to the present embodiment. The operations described in this flow chart can be processed by execution by the CPU of a computer program read into the memory that is included in the respective apparatuses.

In step S1301, the control apparatus 1101 registers the projector apparatus 300 and the network camera 1102 used in the videoconference. The control apparatus 1101 is started in response to user input of an audio command or a remote control operation or a request from the other video conferencing system 1100 to commence the videoconference. As in the first embodiment, the control apparatus 1101 may automatically register the projector apparatus 300 and the network cameras 1102 located in the range capable of communicating via network 105.

In step S1302, an obtaining unit 401 of the control apparatus 1101 obtains the projection layout from the user. Further, the control apparatus 1101 obtains the instruction regarding which projector apparatus 300 is allocated for the image transmitted from the other location or the image from the local apparatus. As an example of this allocation, the projection area of the projector apparatus 300 having the highest capability is allocated to the middle and the image of the main camera in the main remote party in the video conferencing system is allocated to this projector apparatus 300. The image of the sub-camera of the main remote party of the video conferencing system is allocated to the projector apparatus 300 having the second highest capability. Further, after the images of the other remote parties are allocated to the proper projector apparatuses, the image of the camera of the local system or the user interface display of the video conferencing apparatus is allocated to the remaining projector apparatuses.

In step S1303, the video conferencing system 1100 adjusts the projection layout. Regarding the adjustment of the projection layout, because it is described in the first embodiment, a description of it will be omitted. In step S1304, the video conferencing system 1100 starts the videoconference. Because the videoconference is same as that of prior art, a description of it will be omitted.

Summary

As described above, in the video conferencing system 1100 according to the present embodiment, an image of a remote party of the videoconference can be allocated to the proper projector apparatus 300.

Modifications

The main modifications will be described hereinafter. The control apparatus 104 may allocate images from the main camera of the main remote party of the video conferencing system to the projector apparatus 300 located adjacent to the person in the video conferencing room. In this manner, it is easier for the person in the video conferencing room to have eye contact with the main remote party of the videoconference. Further, the projection area may be adjusted such that the size of the person in the video conferencing room is the same degree as the size of a person included in the image projected by the projector apparatus 300. This may be achieved by providing data of the proper size, including the image of a person, to the projector apparatus 300 that is to project the image. In addition to or alternatively, it may be achieved by controlling the zoom of the network camera 1102 capturing a person in the remote party of the videoconference. The projector apparatus 300, the network camera 1102 and the control apparatus 1101 are described as an independent apparatus herein, however, at least any one of these apparatuses may be a part of an integrated apparatus. The projector apparatus 300 or the network camera 1102 need not be connected to the control apparatus 1101 via the network 105. The control apparatus 1101 may have a single network interface or may have a plurality of network interfaces. A videoconference may be started in response to a request via an exchange of short messages from the remote party or a request via an invitation from the remote party.

The video or audio data of the network camera 1102 may be transmitted to the other location via the control apparatus 1101 or may be directly transmitted to the other location without passing through the control apparatus 1101. Request for adjustment of the projection layout may be received by the control apparatus 1101 or may be received by the projector apparatus 300 or the network camera 1102. Adjustment of the projection layout may be initiated upon detection of the projection of the image by the network camera 1102 or by gesture detection.

The projection layout or the allocation of the projection may be obtained before the videoconference is started or may be started when a new remote party joins the videoconference. Allocation of the projection may be executed when a new projector apparatus 300 is detected in the network 105. The control apparatuses 1101 included in respective locations may be centralized and located on the network 1110. This centralized control apparatus is capable of controlling the projector system included in each location in an integrated manner. This integrated control apparatus 1101 may be located on the network 105 of any location. Moreover, any of the projector apparatus 300 or the network camera may function as the integrated control apparatus 1101.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001829, filed Jan. 7, 2009 which is hereby incorporated by reference herein in its entirety.

What is claimed is:

1. A control apparatus for controlling a plurality of projector apparatuses projecting an image, comprising:
   an input unit configured to input layout information relating to a layout of projection areas to be projected by the plurality of projector apparatuses;
   an obtaining unit configured to obtain capability information relating to capabilities of the plurality of projector apparatuses;
   a control unit configured to associate the projection areas with the plurality of projector apparatuses based on the layout information and the capability information such that a first projection area is associated with a first projector apparatus and a second projection area is associated with a second projector apparatus whose capability is lower than that of the first projector apparatus, wherein the first projection area is nearer to the center of the projection areas to be projected by the plurality of projector apparatus than the second projection area;

a determination unit configured to determine a correction amount of the plurality of projector apparatuses based on observed projection areas projected by the plurality of projector apparatuses and the projection areas associated with the plurality of projector apparatuses such that a correction amount for the first projector apparatus is determined based on a first observed projection area projected by the first projector apparatus and the first projection area associated with the first projector apparatus and a correction amount for the second projector apparatus is determined based on a second observed projection area projected by the second projector apparatus and the second projection area associated with the second projector apparatus; and a notifying unit configured to notify the plurality of projector apparatuses of correction amounts determined by the determination unit.

2. The apparatus according to claim 1, further comprising a command unit configured to command the plurality of projector apparatuses such that the plurality of projector apparatuses project the image at a different time, wherein the control unit associates the projection areas with the plurality of projector apparatuses based on the time when the image is projected in response to the command.

3. The apparatus according to claim 1, further comprising a command unit configured to command the plurality of projector apparatuses such that the plurality of projector apparatuses project different images from each other, wherein the control unit associates the projection areas with the plurality of projector apparatuses based on the images projected in response to the command.

4. The apparatus according to claim 1, wherein
the obtaining unit obtains the luminance of images projected by the plurality of projector apparatuses,
the determination unit determines a correction amount of the luminance of the plurality of projector apparatuses based on the luminance of the images projected by the plurality of projector apparatuses and obtained by the obtaining unit, and
the notifying unit notifies the plurality of projector apparatuses of the correction amount of the luminance determined by the determination unit.

5. The apparatus according to claim 1, wherein each projector apparatus includes an observation unit, and each such observation unit observes a respective projection area.

6. The apparatus according to claim 1,
wherein the layout information input by the input unit includes priority information relating to priorities of the projection areas,
wherein a first priority, corresponding to the first projection area, is higher than a second priority, corresponding to the second projection area, and
wherein the control unit is configured to associate the projection areas with the plurality of projector apparatuses based on the capability information, the layout information and the priority information such that the first projection area is associated with a first projector apparatus and the second projection area is associated with a second projector apparatus.

7. A control method for controlling a plurality of projector apparatuses for projecting an image by a control apparatus, comprising steps of:
inputting layout information relating to a layout of the projection areas to be projected by the plurality of projector apparatuses;
obtaining capability information relating to capabilities of the plurality of projector apparatuses;

associating the projection areas with the plurality of projector apparatuses based on the layout information and the capability information such that a first projection area is associated with a first projector apparatus and a second projection area is associated with a second projector apparatus whose capability is lower than that of the first projector apparatus, wherein the first projection area is nearer to the center of the projection areas to be projected by the plurality of projector apparatus than the second projection area;

determining a correction amount of the plurality of projector apparatuses based on observed projection areas projected by the plurality of projector apparatuses and the projection areas associated with the plurality of projector apparatuses such that a correction amount for the first projector apparatus is determined based on a first observed projection area projected by the first projector apparatus and the first projection area associated with the first projector apparatus and a correction amount for the second projector apparatus is determined based on a second observed projection area projected by the second projector apparatus and the second projection area associated with the second projector apparatus; and notifying the plurality of projector apparatuses of correction amounts determined at the determining step.

8. The method according to claim 7, further comprising a step of commanding the plurality of projector apparatuses such that the plurality of projector apparatuses project the image at a different time, wherein the associating step includes associating the projection areas with the plurality of projector apparatuses based on the time when the image is projected in response to the command.

9. The method according to claim 7, further comprising a step of commanding the plurality of projector apparatuses such that the plurality of projector apparatuses project different images from each other, wherein the associating step includes associating the projection areas with the plurality of projector apparatuses based on the images projected in response to the command.

10. The method according to claim 7, wherein
the obtaining step includes obtaining the luminance of images projected by the plurality of projector apparatuses,
the determining step includes determining a correction amount of the luminance of the plurality of projector apparatuses based on the luminance of the images projected by the plurality of projector apparatuses, and
the notifying step includes notifying the plurality of projector apparatuses of the correction amount of the luminance determined at the determining step.

11. The method according to claim 7, wherein each projector apparatus includes an observation unit, and each such observation unit observes a respective projection area.

12. The method according to claim 7,
wherein the layout information input at the inputting step includes priority information relating to priorities of the projection areas,
wherein a first priority, corresponding to the first projection area, is higher than a second priority, corresponding to the second projection area, and
wherein the associating step includes associating the projection areas with the plurality of projector apparatuses based on the capability information, the layout information, and the priority information such that the first projection area is associated with a first projector apparatus and the second projection area is associated with a second projector apparatus.

13. A non-transitory computer-readable storage medium for storing a computer program executed by a computer for performing a method of controlling a plurality of projector apparatuses to project an image, the method comprising steps of:

inputting layout information relating to a layout of projection areas to be projected by the plurality of projector apparatuses;

obtaining capability information relating to capabilities of the plurality of projector apparatuses;

associating the projection areas with the plurality of projector apparatuses based on the layout information and the capability information such that a first projection area is associated with a first projector apparatus and a second projection area is associated with a second projector apparatus whose capability is lower than that of the first projector, wherein the first projection area is nearer to the center of the projection areas to be projected by the plurality of projector apparatus than the second projection area;

determining a correction amount of the plurality of projector apparatuses based on observed projection areas projected by the plurality of projector apparatuses and the projection areas associated with the plurality of projector apparatuses such that a correction amount for the first projector apparatus is determined based on a first observed projection area projected by the first projector apparatus and the first projection area associated with the first projector apparatus and a correction amount for the second projector apparatus is determined based on a second observed projection area projected by the second projector apparatus and the second projection area associated with the second projector apparatus; and notifying the plurality of projector apparatuses of correction amounts determined at the determining step.

14. The non-transitory computer-readable storage medium according to claim 13, the method further comprising a step of commanding the plurality of projector apparatuses such that the plurality of projector apparatuses project the image at a different time, wherein the associating step includes associating the projection areas with the plurality of projector apparatuses based on the time when the image is projected in response to the command.

15. The non-transitory computer-readable storage medium according to claim 13, the method further comprising a step of commanding the plurality of projector apparatuses such that the plurality of projector apparatuses project different images from each other, wherein the associating step includes associating the projection areas with the plurality of projector apparatuses based on the images projected in response to the command.

16. The non-transitory computer-readable storage medium according to claim 13, wherein the obtaining step includes obtaining the luminance of images projected by the plurality of projector apparatuses, the determining step includes determining a correction amount of the luminance of the plurality of projector apparatuses based on the luminance of the images projected by the plurality of projector apparatuses, and the notifying step includes notifying the plurality of projector apparatuses of the correction amount of the luminance determined at the determining step.

17. The storage medium according to claim 13, wherein each projector apparatus includes an observation unit, and each such observation unit observes a respective projection area.

18. The non-transitory computer-readable storage medium according to claim 13, wherein the layout information input at the inputting step includes priority information relating to priorities of the projection areas, wherein a first priority, corresponding to the first projection area, is higher than a second priority, corresponding to the second projection area, and wherein the associating step includes associating the projection areas with the plurality of projector apparatuses based on the capability information, the layout information, and the priority information such that the first projection area is associated with a first projector apparatus and the second projection area is associated with a second projector apparatus.

* * * * *